United States Patent [19]

Ronconi

[11] Patent Number: 4,531,772
[45] Date of Patent: Jul. 30, 1985

[54] DEVICE FOR GRASPING, AUTOMATICALLY CENTERING AND ALIGNING THE LONGITUDINAL AXIS OF LONG BODIES ACCORDING TO THE WORKING AXIS

[75] Inventor: Umberto Ronconi, Magliaso, Switzerland

[73] Assignee: Albe S.A., Agno, Switzerland

[21] Appl. No.: 679,085

[22] Filed: Dec. 6, 1984

Related U.S. Application Data

[63] Continuation of Ser. No. 488,641, Apr. 26, 1983, abandoned.

[30] Foreign Application Priority Data

Jun. 3, 1982 [CH] Switzerland .................. 3393/82

[51] Int. Cl.$^3$ ..................... B25J 15/00; B66C 1/44
[52] U.S. Cl. ...................................... 294/115
[58] Field of Search ........... 294/87.24, 88, 106, 294/110 R, 115, 116, 118; 269/201, 228

[56] References Cited

U.S. PATENT DOCUMENTS

| 1,808,689 | 6/1931 | Stenhouse et al. | 294/115 X |
| 1,900,194 | 3/1933 | Niemi | 294/116 X |
| 3,208,789 | 9/1965 | Barry | 294/118 X |
| 3,651,958 | 3/1972 | Evans et al. | 294/115 X |

FOREIGN PATENT DOCUMENTS 54-3759 1/1979 Japan .......................... 294/115

*Primary Examiner*—Johnny D. Cherry
*Attorney, Agent, or Firm*—Young & Thompson

[57] ABSTRACT

The device permits of grasping, centering automatically and aligning the longitudinal axis of a long body in particular of a pen body according to the working axis (B) or corresponding to the following operation carried out on a machine tool which is preferably automatic. It comprises a toggle lifting mechanism (6, 7, 8, 9) provided with grasping jaws (8', 9') for the long body, jaws made angled by which grasping the long body they determine the movement of translation until they bring the longitudinal axis (A) of the grasped body into the exact position of centering and alignment with the working axis (B) or corresponding to the following operation. A piston operated pneumatically or in another manner permits moving the lever mechanism closing it on the long body opposing a spring (12).

1 Claim, 5 Drawing Figures

DEVICE FOR GRASPING, AUTOMATICALLY CENTERING AND ALIGNING THE LONGITUDINAL AXIS OF LONG BODIES ACCORDING TO THE WORKING AXIS

This application is a continuation of application Ser. No. 488,641, filed 4/26/83, now abandoned.

The present invention has as its object a device for grasping, centering automatically and aligning the longitudinal axis of long bodies in particular bodies of pens according to the working axis or corresponding to the following operation.

The device in question applied to the station which controls the operation unit (whether it is a motor, or control or a punch etc.) guarantees automatically an automatic centering locking of the pen body and the perfect alignment of its axis with the working axis of the said station.

All this is without having recourse to the known auxiliary systems whether locking or centering which badly adapt to a wide range of long bodies.

The main feature of the device in question is that it may be used for a wide range of long bodies in particular bodies of writing instruments (for example the socalled "direct fillers") without having to replace the self-centering jaws which being provided with a relative movement come to take the working body, lock it and carry it in perfect alignment with the working axis of the station, the self-centering jaws already having been pre-aligned perfectly with the working axis.

The device in question may in addition be controlled in any way with any known conventional system, for example, pneumatic, mechanical, hydraulic, electromechanical etc.

Its application is in principle possible either to rotating table or linear transfer machines.

Actually over "linear transfer" it has very considerable advantages eliminating automatically with its application the elements employed up till now for locking and centering the piece and namely, for example:

- elements which lift the piece from the conveyor chain;
- opposing elements fixed to a control cross-piece which along with the elements which raise the piece lock this latter;
- auxiliary locking elements such as elastic or pneumatic opposers;
- centering elements for reference to the working axis such as guide bushes or similar elements.

The said elements have in fact the following disadvantages:

- difficult regulation and centering and subject to disorders being fixed on two different bodies each in movement;
- substitution according to the diameter and the hexagonal or profiled dimension of the body not being self-centering and easily influenced by the dimensional variations of the piece.

The known centering elements such as the guide bushes also have drawbacks as working with plastic components at least in the majority of cases gives considerable dimensional variations which cannot be compensated by a constant centering (non self-centering).

The device according to the invention is characterised by a prehensile lifting means provided with grasping jaws for the long body the jaws formed so that grasping the long body they effect the movement of translation until carrying the longitudinal axis into the exact position of centering and alignment with the working axis or corresponding to the following operation; means being provided for displacing the said prehensile lifting means opening it to grasp the long body and closing it to effect the said centering and alignment.

The attached drawings show a preferred embodiment of the device in question in a non-limiting nor binding form.

Figure 1:
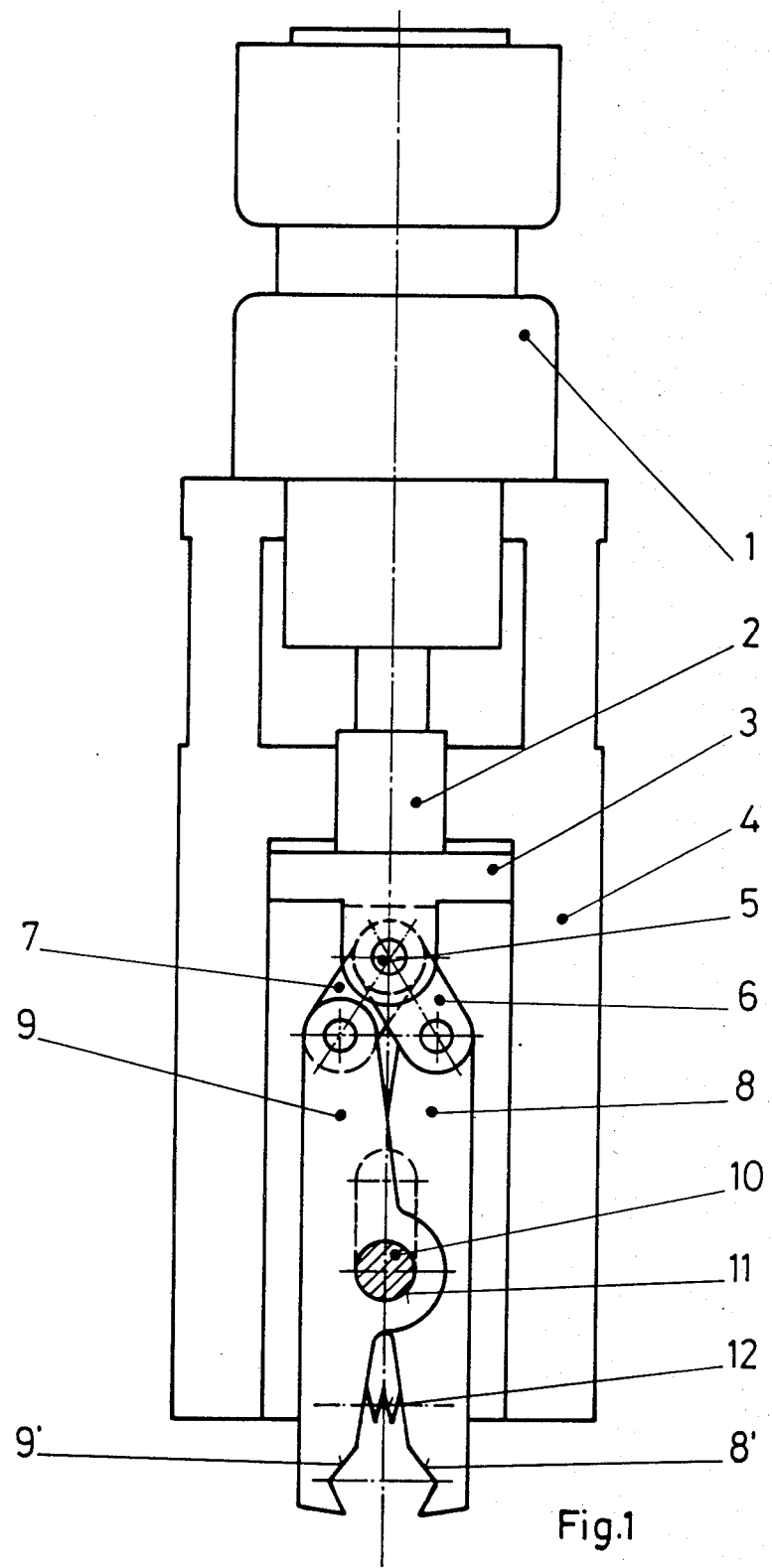
FIG. 1 shows it in front view.

With reference to FIG. 1, the pneumatic apparatus 1 controls the shaft 2 which causes the piston 3 to slide in the fixed support 4.

Figure 2:
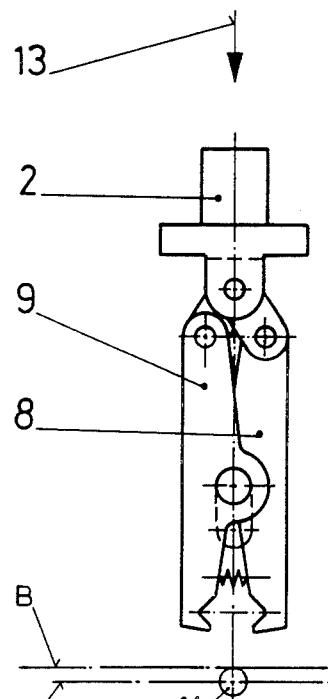
FIGS. 2, 2a, 2b, 2c show it on a smaller scale in the successive phases of closing and re-opening of the prehensile member.

Pivoted at 5 to the piston 3 is provided the toggle composed of the levers 6 and 7, the centering jaws 8 and 9 of which are pivoted on the pivot 10 sliding in the slot or opening in support 4. The ends 8', 9' of the grasping jaws have inner angled faces which in their closing position assume in section the shape of a rhomb, a shape suitable for grasping the pen body 14 (FIG. 2) to selfcenter it and arrange it with its longitudinal axis according to the axis of working (B) of the machine tool or of the punch which has to effect the following work or operation.

Figure 2A:
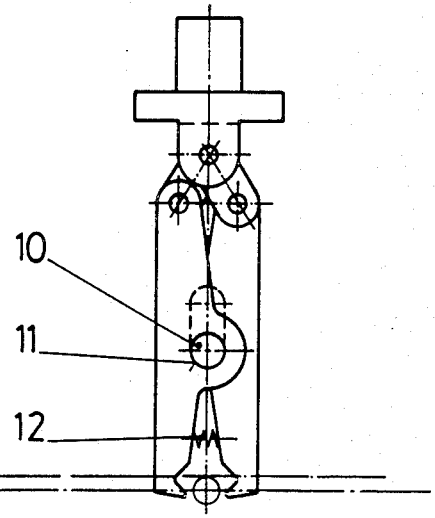
Figure 2B:
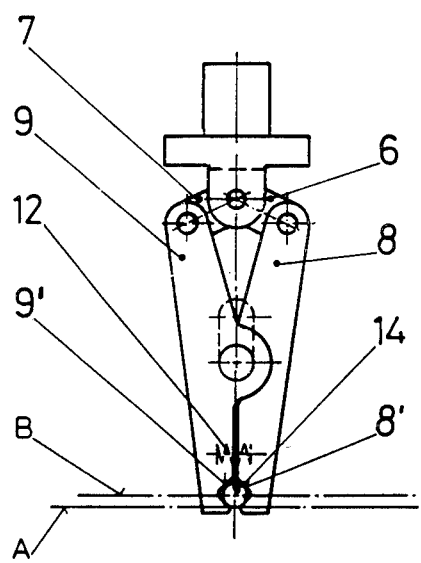

The working of the device (FIGS. 2, 2a, 2b, 2c) is as follows: Pushing the piston 2 in the direction of the arrow 13 (FIG. 2a) the grasping jaws 8 and 9 (FIG. 1) lower until the fulcrum pivot 10 meets the end 11 of the slot or opening 16. The piston 2 continuing its course always in the direction of the arrow 13 by the action of the levers 6 and 7 overcomes the force of the spring 12 causing the closing of the jaws 8 and 9 and therefore of the ends or seatings 8' and 9' (FIG. 2b).

During the closing phase of the seatings 8' and 9' due to the angled shape of the said seatings 8' and 9' the long body 14 is moved from the axis A (FIG. 2b) and perfectly locked, and is arranged on the axis B which is exactly the working axis of the operating unit.

Figure 2C:
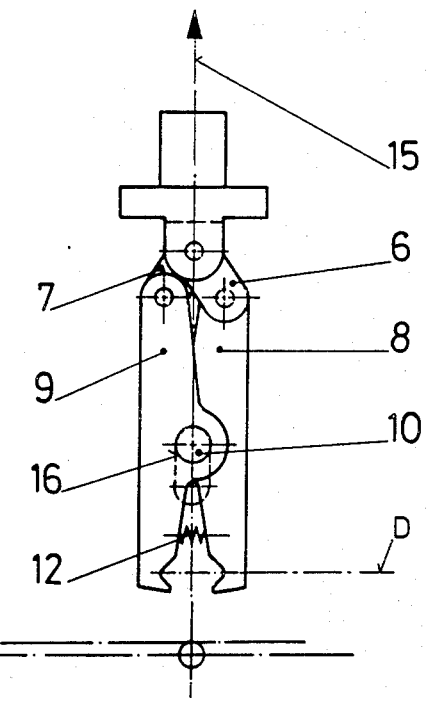

When the operation is finished the piston reverses to the direction of the arrow 15 (FIG. 2c).

The spring 12 reacts opening the self-centering jaws 8 and 9.

The piston 2, continuing its course in the direction of the arrow 15, by means of the levers 6 and 7 brings the jaws 8 and 9 back into the starting position D which coincides with the position of the fulcrum 10 in the upper end of the opening 16 (FIG. 2c).

I claim:

1. A device for grasping and centering automatically long bodies, comprising a support (4) having a slot (16) therein, a fulcrum pivot (10) slidable in the slot (16), a pair of elongated jaws (8,9) pivoted intermediate their ends on the pivot (10), toggle levers (6,7) pivoted one on one end of each of said jaws (8,9), a common pivot (5) interconnecting said toggle levers (6,7) at ends of said levers remote from said jaws (8,9), and means (1–3) for forcing said common pivot (5) in a direction (13) in alignment with the length of said slot (16) and toward a said body to be grasped, said levers and jaws being so disposed that said jaws close toward each other when said fulcrum pivot reaches the end of said slot nearest said body and movement of said common pivot in said direction thereafter continues, said grasping jaws having inner angled faces (8', 9') on their ends remote from said toggle levers (6, 7), said inner angled faces (8', 9') providing a V-shaped recess on said remote end of said grasping jaw (8, 9), said recesses opening toward each other for closing on and automatically centering and grasping a said long body.

* * * * *